(12) United States Patent
Tsuchiya et al.

(10) Patent No.: US 8,875,504 B2
(45) Date of Patent: Nov. 4, 2014

(54) MIXING DEVICE

(71) Applicants: Tomihisa Tsuchiya, Toyota (JP); Shoichi Maeda, Chiryu (JP)

(72) Inventors: Tomihisa Tsuchiya, Toyota (JP); Shoichi Maeda, Chiryu (JP)

(73) Assignees: Toyota Jidosha Kabushiki Kaisha, Aichi-ken (JP); Kabushiki Kaisha Toyota Jidoshokki, Aichi-ken (JP)

( * ) Notice: Subject to any disclaimer, the term of this patent is extended or adjusted under 35 U.S.C. 154(b) by 18 days.

(21) Appl. No.: 13/759,091

(22) Filed: Feb. 5, 2013

(65) Prior Publication Data

US 2013/0205758 A1 Aug. 15, 2013

(30) Foreign Application Priority Data

Feb. 13, 2012 (JP) ................. 2012-028610

(51) Int. Cl.
| | |
|---|---|
| F01N 1/00 | (2006.01) |
| F01N 3/00 | (2006.01) |
| F01N 3/02 | (2006.01) |
| F01N 3/10 | (2006.01) |
| F01N 13/18 | (2010.01) |
| B01F 3/04 | (2006.01) |
| F01N 3/20 | (2006.01) |
| F01N 3/08 | (2006.01) |
| B01F 5/04 | (2006.01) |
| F01N 3/28 | (2006.01) |
| B01F 5/06 | (2006.01) |

(52) U.S. Cl.
CPC ............. *F01N 3/08* (2013.01); *F01N 13/1855* (2013.01); *B01F 2005/0639* (2013.01); *B01F 3/04049* (2013.01); *F01N 13/1805* (2013.01); *F01N 3/2066* (2013.01); *B01F 5/0451* (2013.01); *F01N 3/2892* (2013.01); *Y02T 10/24* (2013.01); *B01F 5/0616* (2013.01)
USPC ................... 60/324; 60/295; 60/303; 60/317

(58) Field of Classification Search
USPC ............................ 60/295, 301, 303, 317, 324
See application file for complete search history.

(56) References Cited

U.S. PATENT DOCUMENTS

2008/0295497 A1   12/2008  Kornherr et al.

FOREIGN PATENT DOCUMENTS

| JP | 2008-280999 A | 11/2008 | |
| WO | WO 2011135161 A1 * | 11/2011 | ................ F01N 3/20 |

* cited by examiner

*Primary Examiner* — Audrey K Bradley
(74) *Attorney, Agent, or Firm* — Sughrue Mion, PLLC

(57) ABSTRACT

A mixing device includes: a cylindrical portion having a blade provided inside thereof for mixing exhaust gas that flows inside of an exhaust pipe of an internal combustion engine, with an additive sprayed into the exhaust pipe by an adding valve; a flange having an insertion hole, into which the cylindrical portion is inserted, and extending outward in a radial direction of the cylindrical portion from an outer peripheral surface of the cylindrical portion; and a plurality of supporting portions that are provided on the flange and that support the cylindrical portion, wherein each of the supporting portions includes an extending piece that extends in a circumferential direction of the cylindrical portion from a base end portion connected to the flange.

7 Claims, 7 Drawing Sheets

F I G . 5
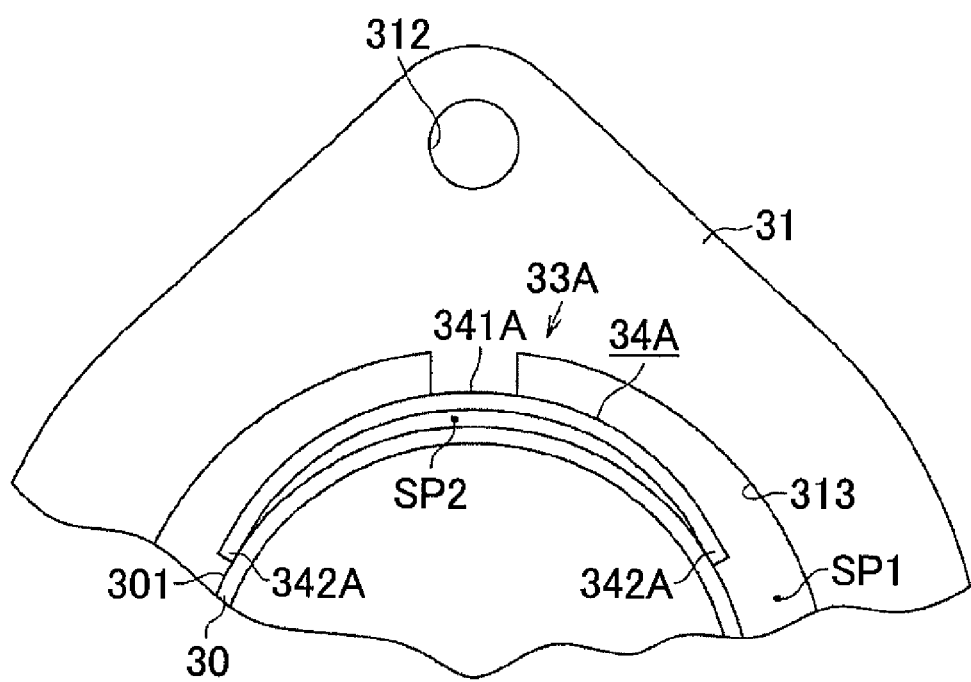

MIXING DEVICE

INCORPORATION BY REFERENCE

The disclosure of Japanese Patent Application No. 2012-028610 filed on Feb. 13, 2012 including the specification, drawings and abstract is incorporated herein by reference in its entirety.

BACKGROUND OF THE INVENTION

1. Field of the Invention

The invention relates to a mixing device that mixes exhaust gas that flows through an exhaust pipe of an internal combustion engine, with an additive sprayed into the exhaust pipe by an adding valve.

2. Description of Related Art

An exhaust gas control apparatus that purifies oxides of nitrogen ($NO_x$) in exhaust gas by reducing $NO_x$ to water and nitrogen is provided in an internal combustion engine. In such an exhaust gas control apparatus, an additive that is a urea aqueous solution is sprayed from an adding valve into an exhaust pipe, and this additive is supplied to an exhaust gas control catalyst arranged on an exhaust gas downstream side (i.e., downstream with respect to the direction in which exhaust gas flows) of the adding valve. Also, a mixing device that is arranged between the adding valve and the exhaust gas control catalyst in the exhaust pipe is provided in the exhaust gas control apparatus (see Japanese Patent Application Publication No. 2008-280999 (JP 2008-280999 A)).

The mixing device described in JP 2008-280999 A is provided with a cylindrical portion that has a cylindrical shape, a plate for mixing exhaust gas and additive that have flowed into the cylindrical portion, and an annular flange that extends radially outward from an outer peripheral surface of the cylindrical portion. A plurality of supporting portions are provided on an inner peripheral edge of this flange, and the flange is attached to the cylindrical portion via these supporting portions. The mixing device is provided in the exhaust pipe, with the flange sandwiched between the exhaust pipe on the upstream side and the exhaust pipe on the downstream side.

FIG. 7 is an exploded perspective view of the mixing device. As shown in FIG. 7, supporting portions 100 are formed by extending pieces that extend inward from an inner peripheral edge of a flange 110 that have been bent. The direction in which the supporting portions 100 extend matches an axial direction of a cylindrical portion 120. When the cylindrical portion 120 is press-fit into the flange 110 when attaching the flange 110 to the cylindrical portion 120, the supporting portions 100 are brought into surface contact with the outer peripheral surface of the cylindrical portion 120. In this state, the supporting portions 100 are welded to the cylindrical portion 120. The axial direction of the cylindrical portion 120 matches a direction orthogonal to a plane of the flange 110.

In order to ensure good airtightness at a connecting portion between the exhaust pipe on the upstream side and the exhaust pipe on the downstream side, it is preferable to increase the flatness of the flange 110. However, the flange 110 may become distorted as a result of attaching the flange 110 to the cylindrical portion 120, so that the flatness of the flange 110 may decrease.

That is, when the cylindrical portion 120 is press-fit into the flange 110, the supporting portions 100 deform, with tip ends of the supporting portions 100 becoming displaced to the radial outside of the cylindrical portion 120, and try to pivot with portions that are supported by the flange 110 as the fulcrums, as shown in FIG. 8. At this time, the supporting portions 100 may deform such that areas near portions of the flange 110 to which the supporting portions 100 are connected are partially pushed outward due to force from the pivoting of the supporting portions 100 (also referred to as "deformation force P"), as shown by the chain double-dashed lines in FIG. 8. This partial deformation (i.e., deformation in parts) of the flange 110 leads to a decrease in the flatness of the flange 110.

When attaching the mixing device to the exhaust pipe with the flange 110 that has such a low flatness, it becomes necessary to increase the rigidity of the flange by increasing the thickness of the flange so that such deformation will not occur, or provide a strong sealing mechanism, in order to ensure the airtightness at the connecting portion between the exhaust pipe on the upstream side and the exhaust pipe on the downstream side.

SUMMARY OF THE INVENTION

The invention provides a mixing device, in which the flatness of a flange that has been attached to a cylindrical portion is improved.

One aspect of the invention is a mixing device that includes a cylindrical portion having a blade provided inside thereof for mixing exhaust gas that flows inside of an exhaust pipe of an internal combustion engine, with an additive sprayed into the exhaust pipe by an adding valve; a flange having an insertion hole, into which the cylindrical portion is inserted, and extending outward in a radial direction of the cylindrical portion from an outer peripheral surface of the cylindrical portion; and a plurality of supporting portions that are provided on the flange and that support the cylindrical portion, wherein each of the supporting portions includes an extending piece that extends in a circumferential direction of the cylindrical portion from a base end portion connected to the flange. In the extending piece, another portion than the base end portion may be positioned further inward in the radial direction than the base end portion. The another portion than the base end portion may be a tip end portion of the extending piece. The another portion than the base end portion of the extending piece may be in elastic contact with the outer peripheral surface of the cylindrical portion and the extending piece may be in a bent state.

According to this structure, each of the supporting portions provided on the flange are in elastic contact with the cylindrical portion that has been inserted into the insertion hole formed in the flange. Therefore, when the cylindrical portion is press-fit into the insertion hole when attaching the flange to the cylindrical portion, the supporting portions will try to pivot, so that force from this pivoting of the supporting portions (hereinafter, also referred to as "deformation force") acts on surrounding portions of the flange, including portions that support the supporting portions.

The extending pieces that form the supporting portions extend in the circumferential direction of the cylindrical portion from base end portions connected to the flange, so that the deformation force that acts on the surrounding portions of the flange can be resolved into a component force of a directional component orthogonal to a plane of the flange, and a component force of a directional component along this plane. Of these two types of component forces, the component force of the directional component that is orthogonal to the plane is force that works to push the flange out in a direction orthogonal to the plane. This component force of the directional component that is orthogonal to the plane is comparatively smaller than it is with a related structure in which the cylindrical portion is supported by a flange by extending pieces that extend parallel to an axial direction of the cylindrical portion. As a result, partial deformation of the surrounding portions of the flange is inhibited, so that the flatness of the flange that has been attached to the cylindrical portion is improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is an enlarged plan view of a portion of a mixing device according to another example embodiment of the invention;

DETAILED DESCRIPTION OF EMBODIMENTS

Figure 1:
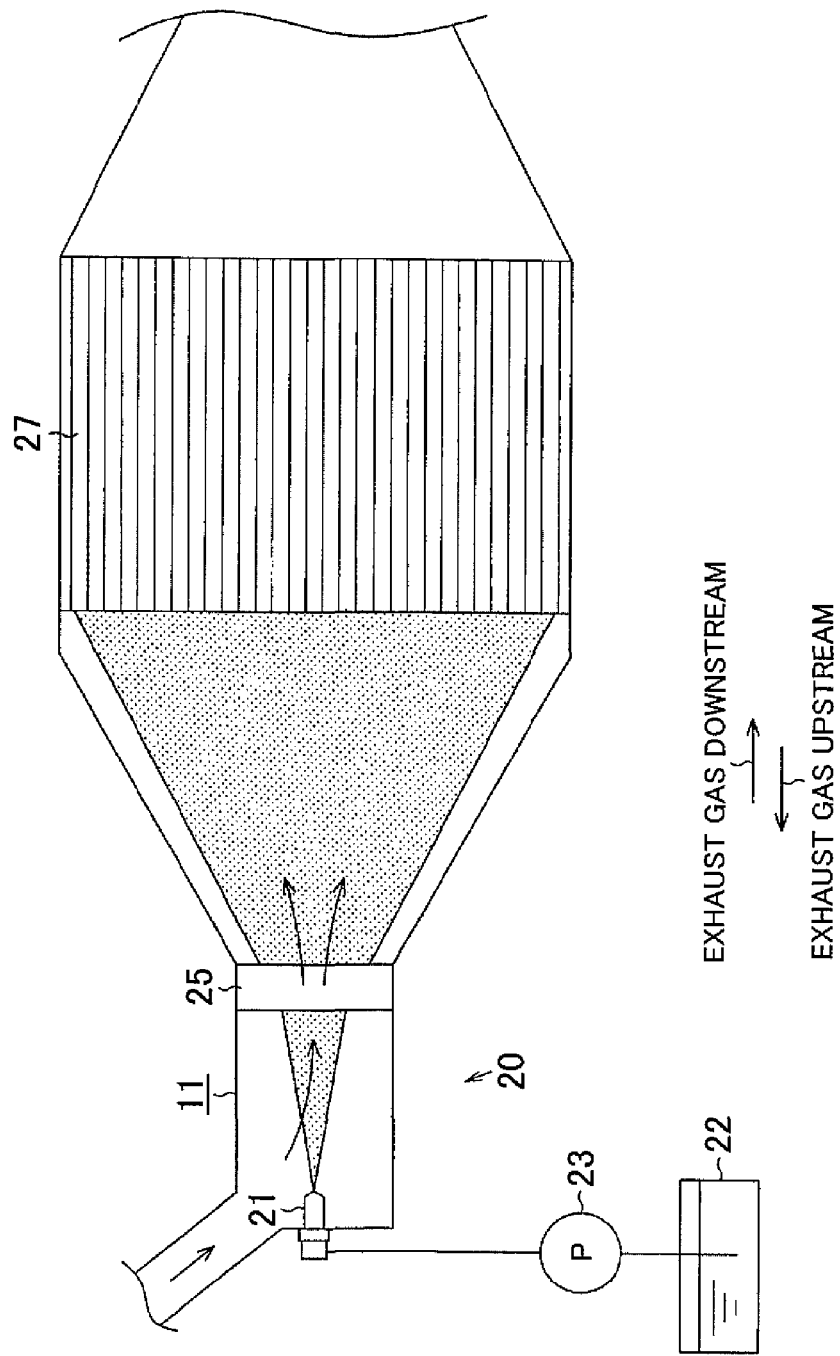
FIG. 1 is a schematic diagram showing an exhaust gas control apparatus provided with a mixing device according to one example embodiment of the invention.

Hereinafter, an example embodiment of the invention will be described with reference to FIGS. 1 to 4. As shown in FIG. 1, an exhaust gas control apparatus 20 of an internal combustion engine is an apparatus that reduces oxides of nitrogen ($NO_x$) in exhaust gas that flows inside an exhaust pipe 11, to water and nitrogen. This exhaust gas control apparatus 20 is provided with an adding valve 21 that sprays urea aqueous solution, which serves as a reducing agent, toward an exhaust gas downstream side (i.e., downstream with respect to the direction in which exhaust gas flows; hereinafter also simply referred to as "downstream" or "downstream side") (to the right in FIG. 1) in the exhaust pipe 11, and a supply pump 23 that operates to supply urea aqueous solution stored in a storage tank 22 to the adding valve 21.

Also, a mixing device 25 that mixes together exhaust gas that flows from an exhaust gas upstream side (i.e., upstream with respect to the direction in which exhaust gas flows; hereinafter also simply referred to as "upstream" or "upstream side") toward the downstream side (i.e., from left to right in FIG. 1) and the urea aqueous solution sprayed by the adding valve 21, is provided downstream of the adding valve 21 in the exhaust pipe 11.

Moisture in the urea aqueous solution that has been mixed with the exhaust gas in this way is vaporized as a result of absorbing heat from exhaust gas that flows with it in the exhaust pipe 11. When this happens, ammonia gas produced by a hydrolysis reaction between the urea in the urea aqueous solution and the water vapor produced by the evaporation of the moisture flows downstream together with the exhaust gas.

An exhaust gas control catalyst 27 that takes in the exhaust gas and the ammonia gas is provided downstream of the mixing device 25 in the exhaust pipe 11. Then, a nitrogen compound in the exhaust gas taken into the exhaust gas control catalyst 27 is reduced to water and nitrogen by the ammonia gas taken into the exhaust gas control catalyst 27 together with the exhaust gas.

Figure 2A:
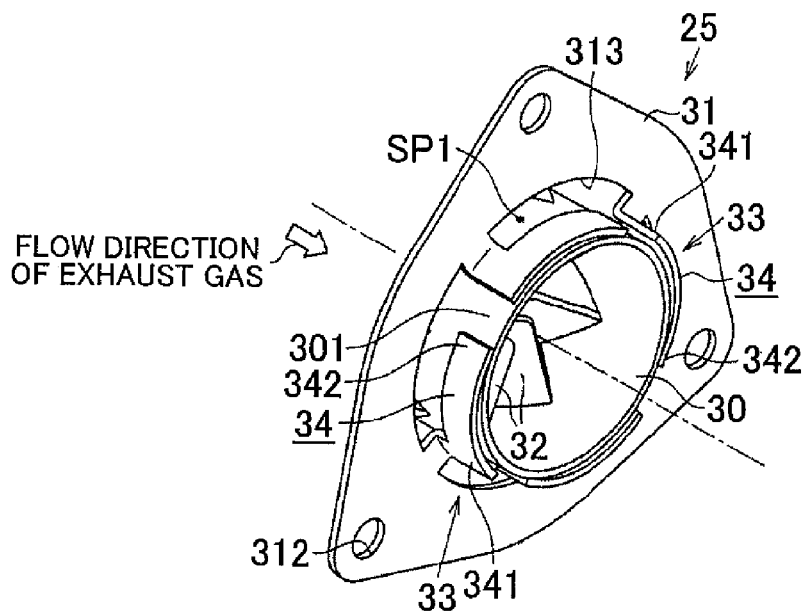
FIG. 2A is a perspective view of the mixing device.

Next, the mixing device 25 of this example embodiment will be described with reference to FIGS. 2A to 4. As shown in FIG. 2A, the mixing device 25 is provided with a cylindrical portion 30 that has a generally cylindrical shape, and a plate-like flange 31 that is attached to this cylindrical portion 30. A plurality of blades 32 arranged along a circumferential direction of the cylindrical portion 30 (hereinafter, simply referred to as the "circumferential direction") are provided inside the cylindrical portion 30. These blades 32 rectify the exhaust gas that has flowed into the cylindrical portion 30 from upstream, and create a rotating flow of exhaust gas downstream of the mixing device 25. As a result, mixing of the exhaust gas and the urea aqueous solution is promoted.

Figure 2B:
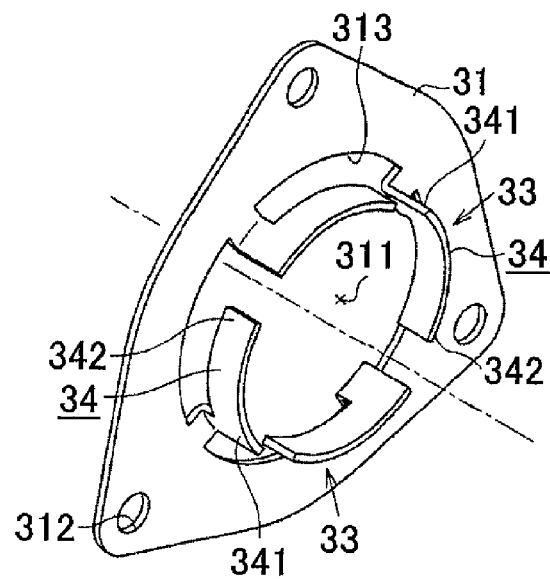
FIG. 2B is a perspective view of a flange.

As shown in FIGS. 2A and 2B, the flange 31 has an insertion hole 311 into which the cylindrical portion 30 is inserted, and extends radially outward of the cylindrical portion 30 from an outer peripheral surface 301 of the cylindrical portion 30 that is inserted into this insertion hole 311. A plurality of bolt insertion holes 312 are formed though the outer peripheral edge side of the flange 31 in an axial direction of the cylindrical portion 30 (i.e., in the direction in which the chain line in FIG. 2 extends). An inner peripheral edge 313 of the flange 31 opposes the outer peripheral surface 301 of the cylindrical portion 30 across a space SP1.

Figure 3:
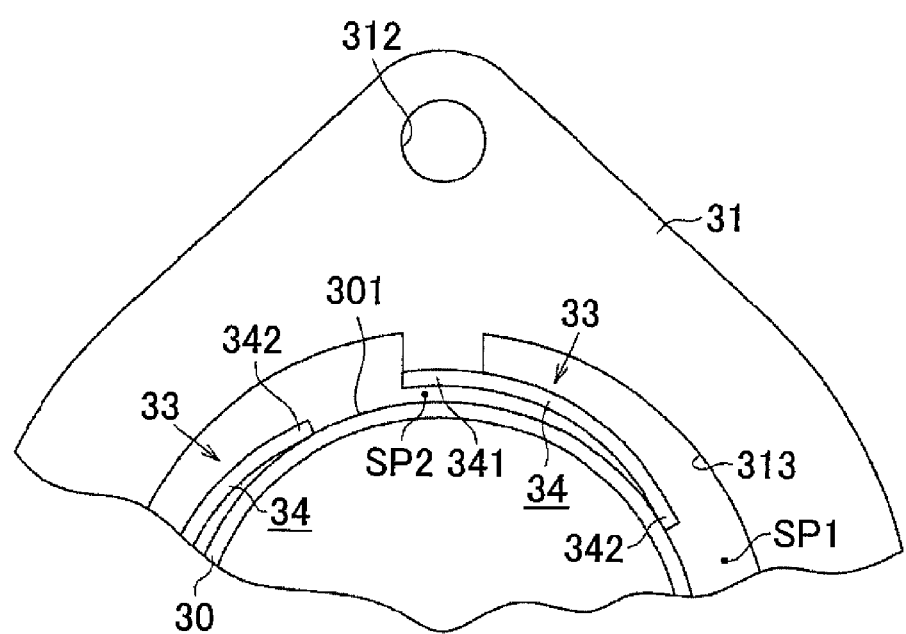
FIG. 3 is an enlarged plan view of a portion of the mixing device.

A plurality of supporting portions 33 that elastically support the cylindrical portion 30 are provided on the inner peripheral edge 313 of the flange 31. These supporting portions 33 are arranged at substantially equally-spaced intervals in the circumferential direction. Each supporting portion 33 is formed by a single extending piece 34 positioned on the downstream side of the flange 31, as shown in FIGS. 2B and 3. The extending piece 34 in this example embodiment is bent from a base end portion 341 that is connected to the flange 31, and extends parallel to the circumferential direction of the cylindrical portion 30. A tip end portion 342 that is positioned on the side opposite the base end portion 341 of the extending piece 34 in the circumferential direction is connected to the outer peripheral surface 301 of the cylindrical portion 30. The blades 32 are not shown in FIG. 3.

At the extending piece 34, a space SP2 is interposed between the base end portion 341 and the outer peripheral surface 301 of the cylindrical portion 30, and the tip end portion 342 that is a portion of the extending piece 34 is in elastic contact with the outer peripheral surface 301 of the cylindrical portion 30. Then this tip end portion 342 is welded to the cylindrical portion 30. This extending piece 34 is arranged parallel to the flow direction of exhaust gas in the exhaust pipe 11.

Figure 4:
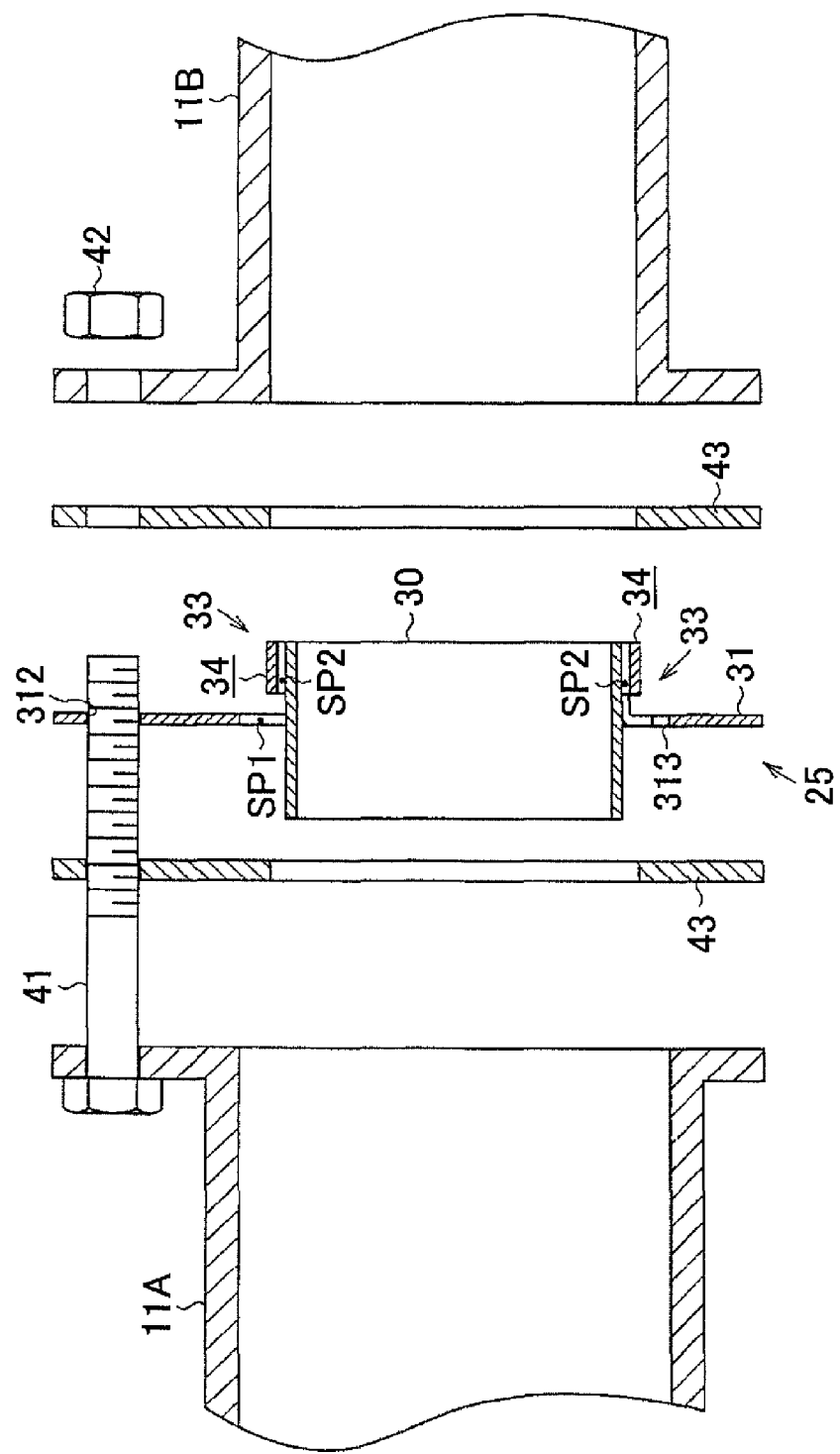
FIG. 4 is a side sectional view illustrating a way in which the mixing device is attached to an exhaust pipe.

The mixing device 25 of this example embodiment is attached to the exhaust pipe 11 via the flange 31. More specifically, as shown in FIG. 4, the flange 31 is fixed to an upstream side exhaust pipe 11A and a downstream side exhaust pipe 11B by a plurality of sets of bolts 41 and nuts 42 (one set only is shown in FIG. 4), while being sandwiched between the upstream side exhaust pipe 11A and the downstream side exhaust pipe 11B. A gasket 43 that has an annular shape is interposed between the flange 31 and the upstream side exhaust pipe 11A, as well as between the flange 31 and the downstream side exhaust pipe 11B. The blades 32 are not shown in FIG. 4.

Next, an assembly method of the mixing device 25 according to this example embodiment will be described. When the cylindrical portion 30 is inserted into the insertion hole 311 of the flange 31, the cylindrical portion 30 is supported by the supporting portions 33 provided on the flange 31. At this time, the inner peripheral edge 313 of the flange 31 opposes the outer peripheral surface 301 of the cylindrical portion 30 across the space SP1. The tip end portions 342 of the extending pieces 34 that form the supporting portions 33 are brought into elastic contact with the outer peripheral surface 301 of the cylindrical portion 30, so that the extending pieces 34 bend.

That is, when the flange 31 is attached to the cylindrical portion 30, the tip end portions 342 of the extending pieces 34 pivot away toward the radial outside from the outer peripheral surface 301 of the cylindrical portion 30. At this time, force from this pivoting of the extending pieces 34 (hereinafter, also referred to as "deformation force") acts on surrounding portions of the flange 31, including the areas that support the supporting portions 33.

Here, the flange 31 of this example embodiment is formed by a plate. Therefore, the flange 31 will easily deform when force acting in a direction orthogonal to the plane of the flange 31 is applied, but will not easily deform when force acting in a direction along the plane of the flange 31 is applied. In other words, the smaller the force acting in the direction orthogonal to the plane of the flange 31 is, the less apt to bend the flange 31 is, and thus the more the flatness of the flange 31 is improved.

In this example embodiment, the extending pieces 34 extend parallel to the circumferential direction from the base end portions 341, so that the direction in which the extending pieces 34 pivot is substantially parallel to the direction along the plane of the flange 31. As a result, when the deformation force acting on the surrounding portions of the flange 31 is resolved into a component force (a first component force) of a directional component orthogonal to the plane of the flange 31, and a component force (a second component force) of a directional component along the plane of the flange 31, the first component is substantially 0 (zero). Therefore, the surrounding portions of the flange 31 will deform little when the flange 31 is attached to the cylindrical portion 30. Thus, the flatness of the flange 31 after being attached to the cylindrical portion 30 is comparable to the flatness of the flange 31 before being attached to the cylindrical portion 30.

Then, the tip end portion 342 of each extending piece 34 is welded to the cylindrical portion 30. Also, the mixing device 25 is attached to the exhaust pipe 11 via the flange 31 that has maintained its flatness. Therefore, the airtightness of the connecting portion between the upstream side exhaust pipe 11A and the downstream side exhaust pipe 11B can be easily ensured without specially increasing the rigidity of the flange 31 or providing a strong sealing mechanism.

As described above, in this example embodiment, the effects described below are obtained. (1) In this example embodiment, the extending pieces 34 that form the supporting portions 33 extend in the circumferential direction of the cylindrical portion 30 from the base end portions 341 that are connected to the flange 31. Therefore, compared with a conventional case in which supporting portions having extending pieces that extend parallel to the axial direction of the cylindrical portion 30 from the base end portions 341 are provided on the flange 31, the first component force that acts on the surrounding portions of the flange 31 is reduced. The surrounding portions of the flange 31 are more resistant to deformation on account of the first component being reduced in this way. Therefore, partial deformation of the portions of the flange 31 that are connected to the supporting portions 33 is inhibited, so that the flatness of the flange 31 that has been attached to the cylindrical portion 30 is improved.

(2) The spaces SP2 are interposed between the base end portions 341 of the extending pieces 34, which are connected to the flange 31, and the outer peripheral surface 301 of the cylindrical portion 30. Therefore, when the flange 31 is attached to the cylindrical portion 30, the extending pieces 34 is elastically deformed, so that the first component force that acts on the flange 31 from these extending pieces 34 is suppressed. In addition, even if the cylindrical portion 30 vibrates when the flange 31 is attached, this vibration is absorbed by the elastic deformation of the extending pieces 34.

(3) In this example embodiment, the extending pieces 34 extend parallel to the circumferential direction of the cylindrical portion 30, so that the first component force that acts on the surrounding portions of the flange 31 is substantially 0 (zero). Therefore, partial deformation of the portions of the flange 31 to which the supporting portions 33 are connected is inhibited, so that the flatness of the flange 31 that has been attached to the cylindrical portion 30 is improved.

(4) The extending pieces 34 extend from the base end portions 341 thereof only on one side in the circumferential direction, and the portions of the extending pieces 34 to which the cylindrical portion 30 is connected (i.e., the tip end portions 342) are end portions on one side in the circumferential direction of the extending pieces 34. By making the distance between the portion of one extending piece 34 that is connected to the flange 31 (i.e., the base end portion 341) and the portion of the extending piece 34 that is connected to the cylindrical portion 30 (i.e., the tip end portion 342) as large as possible in this way, it is possible to make the extending piece 34 flexible. As a result, the flatness of the flange 31 that has been attached to the cylindrical portion 30 is improved by supporting the cylindrical portion 30 with the supporting portions 33 that have these kinds of extending pieces 34.

(5) In this example embodiment, all of the extending pieces 34 extend only on one side in the circumferential direction of the cylindrical portion 30, from the base end portions 341 that are connected to the flange 31. Therefore, the length of one extending piece 34 in the circumferential direction can be increased on account of extending pieces 34 that are adjacent to each other in the circumferential direction tending not to interfere with each other. As a result, the extending piece 34 will bend easily, and, when the flange 31 is attached to the cylindrical portion 30, the extending piece 34 is elastically deformed, so that the first component force that acts on the flange 31 from this extending piece 34 is reduced. Therefore, a decrease in the flatness of the flange 31 is suppressed.

(6) If the extending piece were formed extending in a direction intersecting the circumferential direction, a cylindrical portion that is relatively long in the axial direction would need to be prepared to make this extending piece flexible. Regarding this, the extending piece 34 of this example embodiment extends in a direction parallel to the circumferential direction. Therefore, a certain length of the extending piece 34 is secured regardless of the length of the cylindrical portion 30 in the axial direction.

(7) The extending piece 34 is arranged parallel to the flow direction of exhaust gas in the exhaust pipe 11, so that the flow resistance to the exhaust gas that passes through the space SP2 between the inner peripheral edge 313 of the flange 31 and the outer peripheral surface 301 of the cylindrical portion 30 is reduced. Therefore, the discharging efficiency of the exhaust pipe 11 is improved.

The example embodiment may also be modified to other example embodiments such as those described below.

As shown in FIG. 5, a supporting portion 33A may be provided with an extending piece 34A that extends on both sides in the circumferential direction from a portion 341A that is connected to the flange 31. In this case, both end portions 342A of the extending piece 34A in the circumferential direction may be brought into elastic contact with the outer peripheral surface 301 of the cylindrical portion 30. The flatness of the flange 31 that has been attached to the cylindrical portion 30 is improved also when the supporting portion 33A is provided on the flange 31.

Figure 6:
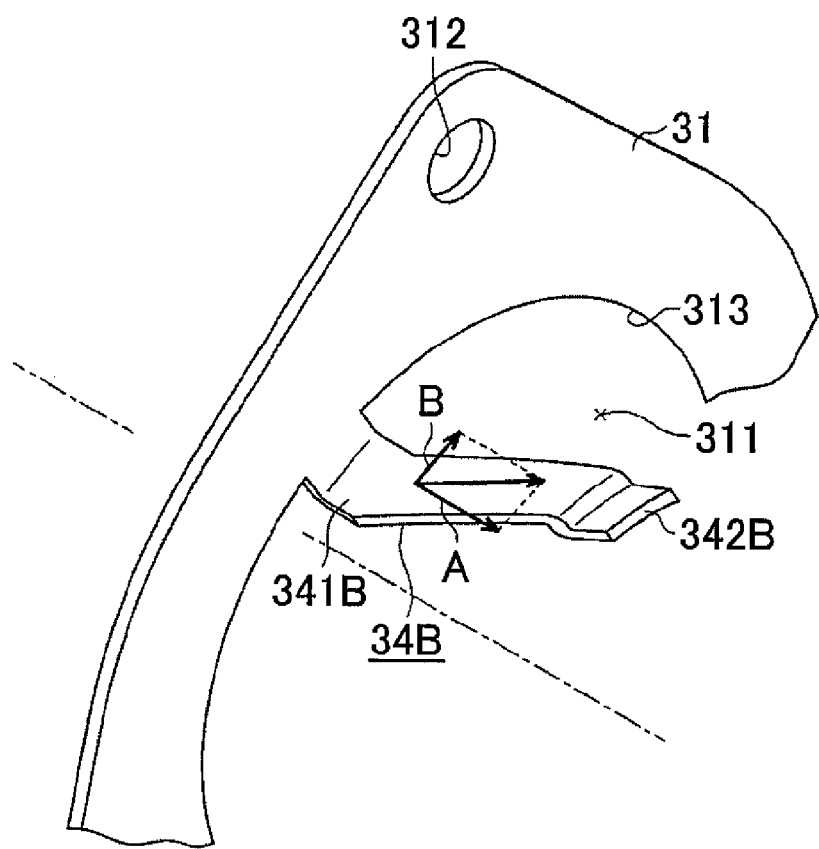
FIG. 6 is a perspective view of an extending piece according to yet another example embodiment.
Figure 7:
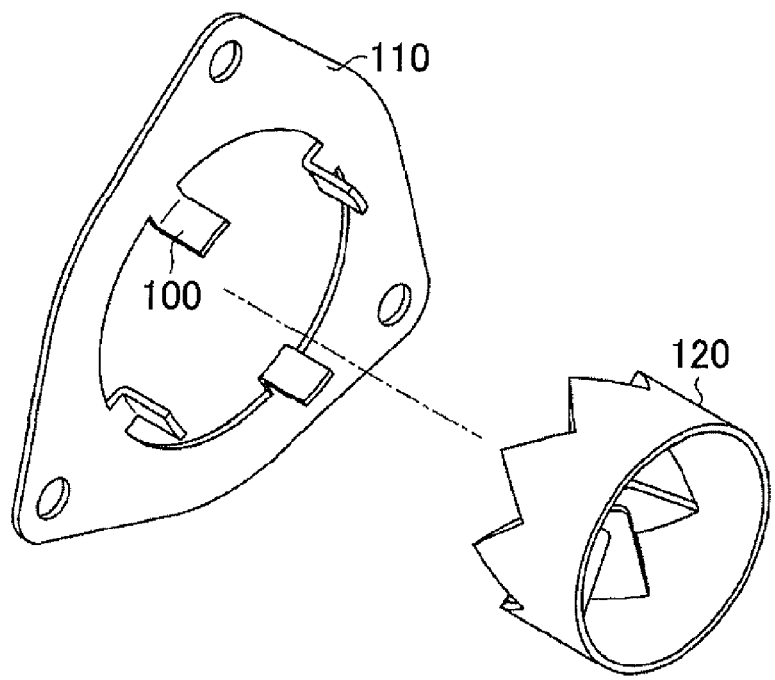
FIG. 7 is an exploded perspective view of a mixing device according to related art.
Figure 8:
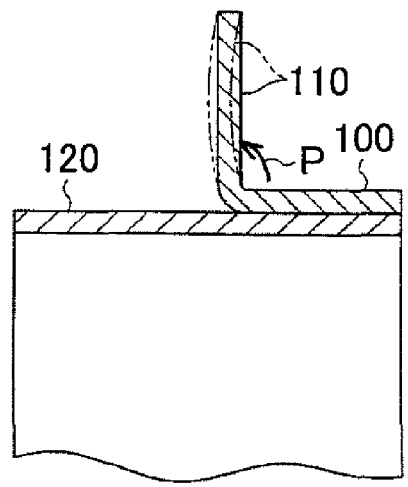
FIG. 8 is a side sectional view schematically showing a state when a flange is attached to a cylindrical portion in the mixing device according to the related art.

As long as the extending piece is formed extending in the circumferential direction of the cylindrical portion 30, the extending piece may extend in a direction other than the direction parallel to this circumferential direction. For example, as shown in FIG. 6, the extending piece may be an extending piece 34B in which the extending direction thereof can be resolved into a first direction A that is parallel to the axial direction of the cylindrical portion 30, and a second direction B that is parallel to the circumferential direction of the cylindrical portion 30. In this case, one end portion 341B of the extending piece 34B in the length direction thereof may be connected to the flange 31, and the other end portion 342B of the extending piece 34B in the length direction thereof may be connected to the outer peripheral surface 301 of the cylindrical portion 30. With this kind of structure as well, compared with a structure in which the extending piece extends in the first direction A parallel to the axial direction, the first component force that acts on the surrounding portion of the flange 31 is reduced, so that this surrounding portion will not easily deform. Therefore, the flatness of the flange 31 is improved.

The extending piece 34 may also be configured such that an area other than the end portions (one end and the other end) in the circumferential direction of the extending piece 34 is connected to the flange 31. Also, the extending piece 34 may be configured such that an area other than the end portions (one end and the other end) in the circumferential direction of the extending piece 34 is connected to the cylindrical portion 30.

As long as the extending piece is brought into elastic contact with the cylindrical portion 30, the extending piece may also be configured without the space SP1 between the portion of the extending piece supported by the flange 31 and the outer peripheral surface 301 of the cylindrical portion 30.

The supporting portion may also include an extending piece positioned on the upstream side of the flange 31.

Aside from urea aqueous solution, the reducing agent may also be an aqueous ammonia solution, an aqueous hydrocarbon solution, or fuel for an internal combustion engine, such as diesel fuel or gasoline fuel.

The extending piece may be connected at a portion thereof to the outer peripheral surface of the cylindrical portion, with a space interposed between the base portion connected to the flange and the outer peripheral surface of the cylindrical portion.

According to this structure, a space is interposed between the portion of each extending piece connected to the flange and the outer peripheral surface of the cylindrical portion, so that the deformation force that acts on the flange from the extending pieces is reduced because of the extending pieces elastically deforming when the flange is attached to the cylindrical portion. In addition, even when the cylindrical portion vibrates with the flange attached, this vibration can be absorbed by the elastic deformation of the extending pieces.

The extending piece may extend parallel to the circumferential direction of the cylindrical portion. According to this structure, the deformation force of the directional component orthogonal to the plane of the flange is minimized. Therefore, the flange is inhibited from partially deforming (i.e., deforming in some parts) by this deformation force, so that a decrease in the flatness of the flange that accompanies attachment of the flange to the cylinder is suppressed.

The extending piece may extend only on one side, in the circumferential direction of the cylindrical portion, from the portion connected to the flange.

According to the structure described above, the extending piece extends only on one side in the circumferential direction of the cylindrical portion. Therefore, the length of one extending piece in the circumferential direction thereof can be increased on account of extending pieces that are adjacent to each other in the circumferential direction tending not to interfere with each other. Thus, the extending piece will bend easily, and the deformation force that acts on the flange from the extending piece is reduced because of the extending piece elastically deforming when attaching the flange to the cylindrical portion. As a result, a decrease in the flatness of the flange is suppressed.

A space may be interposed between an inner peripheral edge of the flange and the outer peripheral surface of the cylindrical portion, and the extending piece may be arranged parallel to a flow direction of the exhaust gas in the exhaust pipe.

According to this structure, the flow resistance to the exhaust gas that flows through the space interposed between the flange and the cylindrical portion is reduced. As a result, the exhaust efficiency of an exhaust pipe is improved.

What is claimed is:

1. A mixing device comprising:
a cylindrical portion having a blade provided inside thereof for mixing exhaust gas that flows inside of an exhaust pipe of an internal combustion engine, with an additive sprayed into the exhaust pipe by an adding valve;
a flange having an insertion hole, into which the cylindrical portion is inserted, and extending outward in a radial direction of the cylindrical portion from an outer peripheral surface of the cylindrical portion; and
a plurality of supporting portions that are provided on the flange and that support the cylindrical portion, wherein
each of the supporting portions includes an extending piece that extends in a circumferential direction of the cylindrical portion from a base end portion which is connected to the flange to a tip end portion which is not connected to the flange.

2. The mixing device according to claim 1, wherein the extending piece is connected at the tip end portion thereof to the outer peripheral surface of the cylindrical portion, with a space interposed between the base end portion connected to the flange and the outer peripheral surface of the cylindrical portion.

3. The mixing device according to claim 1, wherein a space is interposed between an inner peripheral edge of the flange and the outer peripheral surface of the cylindrical portion, and the extending piece is arranged parallel to a flow direction of the exhaust gas in the exhaust pipe.

4. The mixing device according to claim 1, wherein, in the extending piece, the tip end portion is positioned further inward in the radial direction than the base end portion.

5. The mixing device according to claim 4, wherein
the tip end portion of the extending piece is in elastic contact with the outer peripheral surface of the cylindrical portion and the extending piece is in a bent state.
6. The mixing device according to claim 1, wherein
the extending piece extends parallel to the circumferential direction of the cylindrical portion.
7. The mixing device according to claim 6, wherein
the extending piece extends only on one side, in the circumferential direction of the cylindrical portion, from the base end portion connected to the flange.

* * * * *